United States Patent
Oblizajek et al.

(10) Patent No.: US 11,204,077 B2
(45) Date of Patent: Dec. 21, 2021

(54) HYDRAULIC MOUNT ASSEMBLY AND A POWERTRAIN THAT UTILIZES THE HYDRAULIC MOUNT ASSEMBLY

(71) Applicant: GM GLOBAL TECHNOLOGY OPERATIONS LLC, Detroit, MI (US)

(72) Inventors: Kenneth L. Oblizajek, Troy, MI (US); Wojciech E. Suchta, Richmond Hill (CA)

(73) Assignee: GM Global Technology Operations LLC, Detroit, MI (US)

( * ) Notice: Subject to any disclaimer, the term of this patent is extended or adjusted under 35 U.S.C. 154(b) by 218 days.

(21) Appl. No.: 16/552,473

(22) Filed: Aug. 27, 2019

(65) Prior Publication Data

US 2021/0061379 A1 Mar. 4, 2021

(51) Int. Cl.
| | |
|---|---|
| *F16F 13/10* | (2006.01) |
| *F16F 13/26* | (2006.01) |
| *F16F 13/30* | (2006.01) |
| *F16F 13/00* | (2006.01) |
| *F16F 6/00* | (2006.01) |
| *F16F 9/53* | (2006.01) |

(52) U.S. Cl.
CPC .............. *F16F 13/266* (2013.01); *F16F 6/00* (2013.01); *F16F 13/00* (2013.01); *F16F 13/102* (2013.01); *F16F 13/106* (2013.01); *F16F 13/305* (2013.01); *F16F 9/53* (2013.01)

(58) Field of Classification Search
CPC ...... F16F 13/164; F16F 13/266; F16F 13/102; F16F 13/105; F16F 13/106; F16F 13/264

USPC ......................................... 267/140.14, 140.15
See application file for complete search history.

(56) References Cited

U.S. PATENT DOCUMENTS

| | | | | |
|---|---|---|---|---|
| 4,650,170 A | * | 3/1987 | Fukushima | ........... F16F 13/264 188/378 |
| 4,789,142 A | * | 12/1988 | Hoying | ................. F16F 13/264 267/140.15 |
| 4,793,600 A | * | 12/1988 | Kojima | ................... F16F 13/26 188/322.13 |
| 5,246,211 A | * | 9/1993 | Klein | .................... F16F 13/105 267/140.13 |

(Continued)

FOREIGN PATENT DOCUMENTS

| | | | | |
|---|---|---|---|---|
| DE | 19801277 A1 | * | 7/1999 | ............. F16F 13/26 |
| DE | 10316283 A1 | * | 10/2004 | ............ F16F 13/106 |

*Primary Examiner* — Thomas J Williams
(74) *Attorney, Agent, or Firm* — Quinn IP Law

(57) ABSTRACT

A hydraulic mount assembly includes a mount body defining a cavity. A powertrain includes a dynamic mass, and a structure that supports the dynamic mass. The assembly is attached to the structure and supports the dynamic mass. A first plate is fixed relative to the mount body inside the cavity to separate the cavity into a first chamber and a second chamber. The first plate defines a plurality of first passages that fluidly connects the first and second chambers. A decoupler is disposed between the first and second chambers. An actuator is coupled to the first plate. The decoupler is movable in response to actuation of the actuator. The decoupler abuts the first plate when in a locked position to prevent fluid communication through the first passages. The decoupler is movable relative to the first plate when in an unlocked position to allow fluid communication through the first passages.

20 Claims, 3 Drawing Sheets

(56) References Cited

U.S. PATENT DOCUMENTS

| | | | | |
|---|---|---|---|---|
| 5,246,213 A | * | 9/1993 | Zup | F16F 13/26 |
| | | | | 267/140.14 |
| 5,718,417 A | * | 2/1998 | Aoki | F16F 13/264 |
| | | | | 267/140.14 |
| 5,911,412 A | * | 6/1999 | Durand | F16F 13/26 |
| | | | | 267/140.13 |
| 6,357,730 B1 | * | 3/2002 | Gugsch | F16F 13/106 |
| | | | | 267/140.15 |
| 2021/0095737 A1 | * | 4/2021 | Oblizajek | B60K 5/1208 |

* cited by examiner

HYDRAULIC MOUNT ASSEMBLY AND A POWERTRAIN THAT UTILIZES THE HYDRAULIC MOUNT ASSEMBLY

INTRODUCTION

Vehicles are subject to vibrations due to external factors, such as road conditions, and internal factors, from rotating members such as operation of a powertrain and individual tires/wheels.

SUMMARY

The present disclosure provides a hydraulic mount assembly that includes a mount body defining a cavity. The assembly also includes a first plate fixed relative to the mount body inside the cavity to separate the cavity into a first chamber and a second chamber. The first plate defines a plurality of first passages that fluidly connects the first and second chambers. The assembly further includes a decoupler disposed between the first chamber and the second chamber. The decoupler also overlaps the first plate. The assembly also includes an actuator coupled to the first plate. The decoupler is movable between a locked position and an unlocked position in response to actuation of the actuator. The decoupler abuts the first plate when in the locked position to prevent fluid communication through the first passages. The decoupler is movable relative to the first plate when in the unlocked position to allow fluid communication through the first passages.

The present disclosure provides a powertrain that includes a dynamic mass, and a structure that supports the dynamic mass. The powertrain also includes the hydraulic mount assembly, as discussed above, which is attached to the structure and supports the dynamic mass.

The detailed description and the drawings or FIGS. are supportive and descriptive of the disclosure, but the claim scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the FIGS. to aid the reader's understanding, and do not represent limitations (for example, to the position, orientation, or use, etc.) on the scope of the disclosure, as defined by the appended claims.

Furthermore, the term "substantially" can refer to a slight imprecision or slight variance of a condition, quantity, value, or dimension, etc., some of which that are within manufacturing variance or tolerance ranges. The phrase "at least one of" as used herein should be construed to include the non-exclusive logical "or", i.e., A and/or B and so on depending on the number of components.

Figure 1:
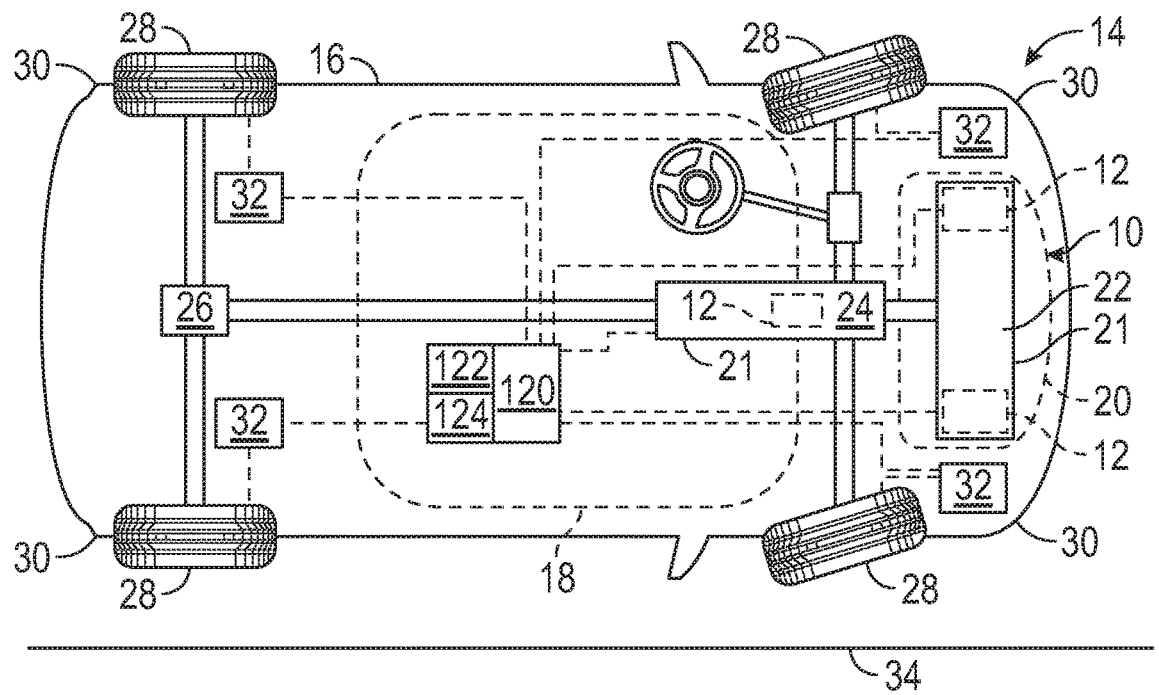
FIG. 1 is a schematic illustration of a powertrain with a dynamic mass, and a hydraulic mount assembly supporting the powertrain.
Figure 2:
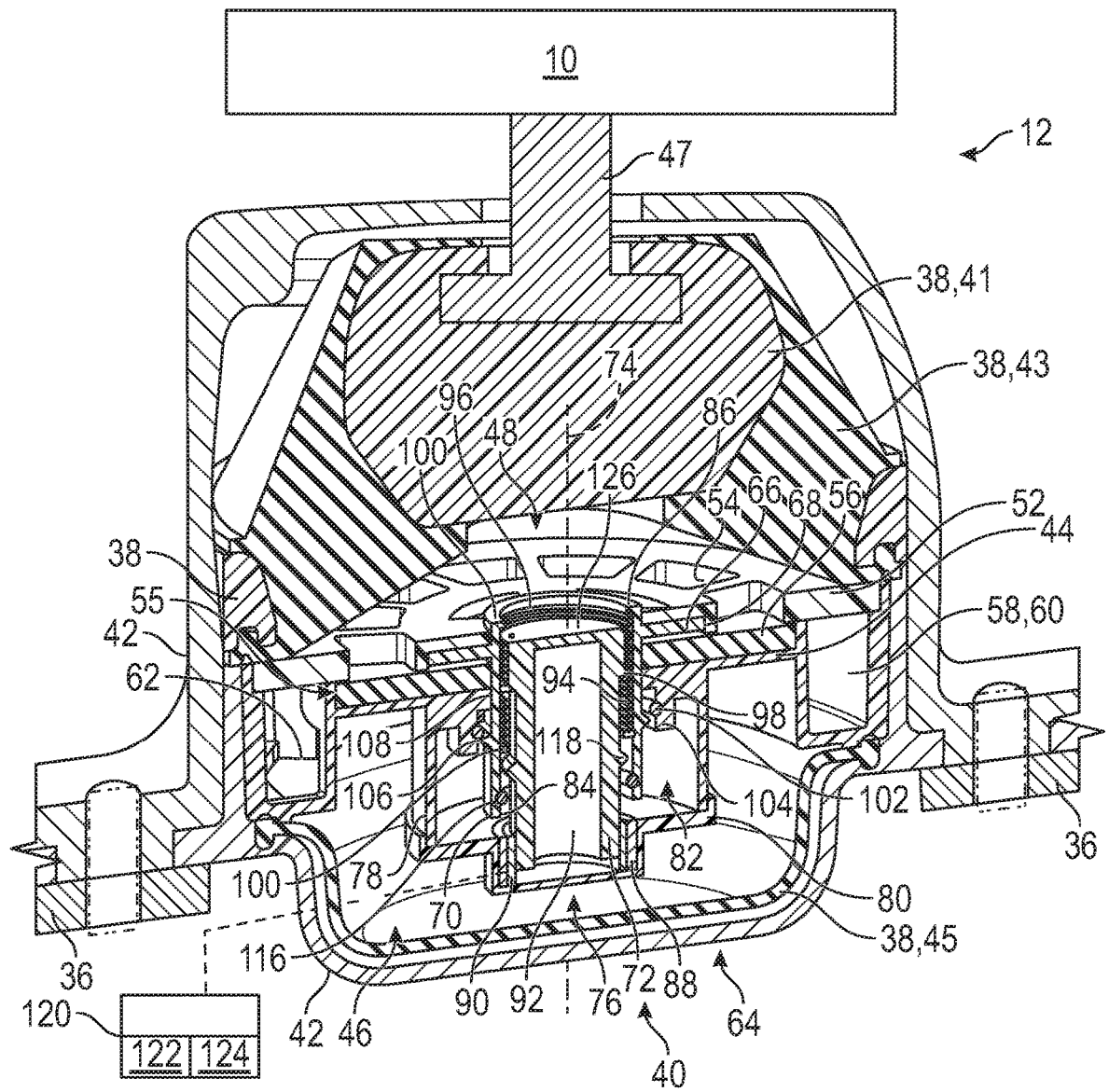
FIG. 2 is a schematic illustration of the powertrain, with a cross-sectional view of the hydraulic mount assembly and a structure that supports the powertrain.

Referring to the FIGS., wherein like numerals indicate like or corresponding parts throughout the several views, a powertrain 10 and a hydraulic mount assembly 12 are generally shown in FIGS. 1 and 2. As discussed in detail below, generally, the hydraulic mount assembly 12 may reduce vibrations from the powertrain 10 and other components. Any suitable number of hydraulic mount assemblies 12 may be used to support the powertrain 10, and the below discussion focuses on one hydraulic mount assembly 12 but it is to be appreciated that the discussion also applies to more than one hydraulic mount assembly 12.

Referring to FIG. 1, the powertrain 10 and the hydraulic mount assembly 12 may be used in a vehicle 14. Non-limiting examples of the vehicle 14 may include a car, a truck, a motorcycle, an off-road vehicle, a farm vehicle, a watercraft, an aircraft, or any other suitable moveable platform. Additionally, the vehicle 14 may be a diesel/gas-powered vehicle, a hybrid vehicle, an electric vehicle, etc. It is to be appreciated that alternatively, the powertrain 10 and the hydraulic mount assembly 12 may be used in a non-vehicle application, such as, farm equipment, stationary platforms, etc.

Continuing with FIG. 1, the vehicle 14 may include a body 16 having a passenger compartment 18 in which a passenger may enter and exit the vehicle 14. The body 16 of the vehicle 14 may also include an engine compartment 20 proximal to the passenger compartment 18. The vehicle 14 may also include a dynamic mass 21. The dynamic mass 21 may include a prime mover 22 that is housed in the engine compartment 20. Non-limiting examples of the prime mover 22 may include an engine such as an internal combustion engine, one or more electric motors, a combination of the engine and one or more of the electric motors etc. Generally, the powertrain 10 may include the dynamic mass 21, and thus, the prime mover 22.

Continuing with FIG. 1, the vehicle 14 may also include a transmission 24 coupled to the prime mover 22. The transmission 24 and the prime mover 22 may include housing structures that are rigidly attached to each other, which create a larger dynamic mass 21 as compared to separating the mass of the transmission 24 and the mass of the prime mover 22. As such, in certain configurations, the dynamic mass 21 may include the prime mover 22 and/or the transmission 24 and/or one or more electric motors, etc.

For the electric or hybrid vehicle applications, the powertrain 10 may include one or more batteries that electrically connect to one or more of the electric motors to operate or power the electric motors that propel the vehicle 14, and therefore, the dynamic mass 21 of these types of vehicles 14 may include the batteries. Generally, the dynamic mass 21 of the vehicle 14 is any structure (mass) that is being supported via the hydraulic mount assembly 12.

Under certain operating conditions, such as during idling of the vehicle 14, the internal components of the prime mover 22 may move while the vehicle 14 remains stationary, and during this operating condition, it may be desirable to virtually decouple the dynamic mass of the vehicle 14 from the body 16 of the vehicle 14 via the hydraulic mount assembly 12. By decoupling the dynamic mass of the vehicle 14 from the body 16 of the vehicle 14, vibration transfer from the moving internal components of the prime mover 22 to the occupants of the vehicle 14 is reduced. Under other operating conditions, such as during motion of the vehicle 14, it may be desirable to operate different properties of the hydraulic mount assembly 12 through internal hydro-elastic properties of the hydraulic mount assembly 12. Additional improvements in vibration suppression may be realized by the controlled active features embedded in the hydraulic mount assembly 12, some of which are discussed below.

The prime mover 22 is configured to produce a torque. The transmission 24 is coupled to the prime mover 22 to receive the torque outputted from the prime mover 22. An input member is connected to the prime mover 22 to receive the torque from the prime mover 22, and the input member is rotatable to transfer the torque. An output member is coupled to the input member, and the output member is rotatable to transfer the torque from the prime mover 22. Generally, the output member is indirectly coupled to the input member. Therefore, various components, mechanisms, devices, structures, etc., may be disposed between the output member and the input member to couple these members together (which may couple these members together hydraulically, electronically, mechanically, etc., and combinations thereof). The prime mover 22 may include an output shaft (or crankshaft), and the input member may be coupled to the output shaft.

In certain configurations, the transmission 24 may include the input member and the output member. The output shaft of the prime mover 22 rotates at an engine speed, and the torque from rotation of the output shaft is transferred to the input member of the transmission 24, which causes the input member to rotate. The transmission 24 may include a final drive coupled to the input member and the output member that delivers output torque to one or more drive axles 26 through the final drive, and ultimately to wheels 28. One of the wheels 28 may be disposed near or proximal to each corner 30 of the vehicle 14. Therefore, the torque from the prime mover 22 is transferred to the transmission 24, and the transmission 24 outputs the output torque to drive the wheels 28. The vehicle 14 may be configured to drive front wheels 28 (e.g. a front-wheel drive (FWD) vehicle), rear wheels 28 (e.g. a rear-wheel drive (RWD) vehicle) or all wheels 28 (e.g. an all-wheel drive (AWD) vehicle). It is to be appreciated that the final drive may be driven by an endless rotatable member, and non-limiting examples of the endless rotatable member may include a belt or a chain.

Continuing with FIG. 1, one or more sensors 32 may be coupled to one or more of the wheels 28. In certain configurations, one of the sensors 32 is coupled to each one of the wheels 28. Generally, the sensors 32 may be used to determine speed of the wheel 28 and/or a relative angular position of the wheel 28. The speed of the wheel 28 may be used to detect vibrations at the respective wheels 28 and may provide a reference point for active suppression of periodic vibrations originating at the wheels 28. More specifically, as a non-limiting example, the sensors 32 may include a speed sensor 32 that may be used to detect periodic vibrations at the respective wheels 28 which is used to compile information regarding interior periodic vibrations attributable to the respective corners 30 of the vehicle 14. As other non-limiting examples, the sensors 32 may include a motion sensor, an angular speed sensor, etc. The motion sensor, for example, may be used to sense at least one of acceleration of the wheels 28, velocity of the wheels 28 and dynamic displacement of the wheels 28. Generally, the motion sensor is used in the vehicles 14 that are equipped with suspension systems featuring controlled passive damping devices using magnetorheological (MR) fluid, electrorheological (ER) fluid and other mechanical members such as control valves. The angular speed sensor, for example, may be used to sense the angular rotation speed of the wheels 28. In certain configurations, information from the sensors 32 may be communicated to a tracking filter that uses this information in a control operation of the hydraulic mount assembly 12. It is to be appreciated that using the sensors 32 in conjunction with the hydraulic mount assembly 12 including the active features discussed herein eliminates the need to include any additional sensors on the vehicle 14, such as on the suspension system of the vehicle 14 and/or any additional sensors remotely located on the body 16 or the passenger compartment 18 of the vehicle 14, which thus, reduces costs.

When the vehicle 14 moves along the road 34, vibrations may enter the body 16 of the vehicle 14. For example, as the wheels 28 rotate along the road 34, vibrations from the interaction of the wheels 28 with the road 34 may enter the body 16 of the vehicle 14, and may be transferred to the powertrain 10 and/or the passenger compartment 18. Furthermore, operation of the powertrain 10, such as the prime mover 22, may cause vibrations that may be transferred to the passenger compartment 18. The hydraulic mount assembly 12 may reduce or suppress vibrations from the powertrain 10 and/or reduce or suppress vibrations from the wheels 28 in combination with the dynamic mass 21. Therefore, the hydraulic mount assembly 12 provides a reduction or minimization of vibrations felt in the passenger compartment 18 due to operation of the vehicle 14. The primary reduction of vibrations from the powertrain 10 versus the wheels 28 may occur during different modes of operation of the vehicle 14. For example, when the vehicle 14 is turned on and idling, the primary reduction of vibration of the powertrain 10 occurs in this situation. As another example, when the vehicle 14 is moving along the road 34, the primary reduction of vibration in the wheels 28 occurs in this situation.

Referring to FIG. 2, the powertrain 10 may include the prime mover 22, and the vehicle 14, which includes the powertrain 10, may include a structure 36 that supports the dynamic mass 21. As mentioned above, the dynamic mass 21 may include the prime mover 22, and thus, the structure 36 may support the prime mover 22. The transmission 24 may also be supported via the structure 36. The structure 36 may be a cradle, a frame, a support or any other structure that supports the powertrain 10 or components to operate the powertrain 10 such as the batteries for the electric vehicle application. Generally, the structure 36 is disposed beneath the powertrain 10, and specifically, beneath the prime mover 22, the transmission 24, the batteries if using the electric or hybrid vehicle applications, etc. Therefore, the hydraulic mount assembly 12 is operable between the powertrain 10 and the structure 36. For example, generally, the hydraulic mount assembly 12 is attached to the structure 36 and supports the dynamic mass 21. More specifically, the hydraulic mount assembly 12 may be operable between the prime mover 22 and the structure 36. For the electric or hybrid vehicle applications, the hydraulic mount assembly 12 may support the structure 36 that supports the batteries, and thus, the hydraulic mount assembly 12 may be operable between the batteries and the structure 36.

Referring to FIG. 2, the hydraulic mount assembly 12 includes a mount body 38 defining a cavity 40. Generally, the mount body 38 is attached to the structure 36. In certain configurations, a cover 42 may be disposed around the mount body 38, and the cover 42 may be directly attached to the structure 36. As such, the mount body 38 may be indirectly attached to the structure 36. The cover 42 may provide a rigid structure that houses various components discussed herein.

Continuing with FIG. 2, the mount body 38 may include a first portion 41 and a second portion 43 secured to each other, and forms an upper boundary of the cavity 40. The mount body 38 may include a third portion 45, which may be referred to as a bladder, spaced from the first and second portions 41, 43, and forms a lower boundary of the cavity 40. The first and second portions 41, 43 may be movable together in response to one or more forces, which for example, the second portion 43 may dynamically deflect. The third portion 45 is movable in response to movement of the fluid which is caused by relative movement of the first portion 41 and the structure 36.

The first and second portions 41, 43 may be formed of a material that has damping features, and non-limiting examples of the materials may include one or more of polymer(s), nylon(s), rubber(s), composite(s), etc. The third portion 45 may be formed of a material that has flexible features, and non-limiting examples of the materials may include one or more of polymer(s), rubber(s), etc.

The hydraulic mount assembly 12 may include a post 47 that is secured to the first portion 41 of the mount body 38 and the powertrain 10. Depending on the direction of the force, the first, second, and third portions 41, 43, 45 may move relative to the cavity 40.

Figure 5:
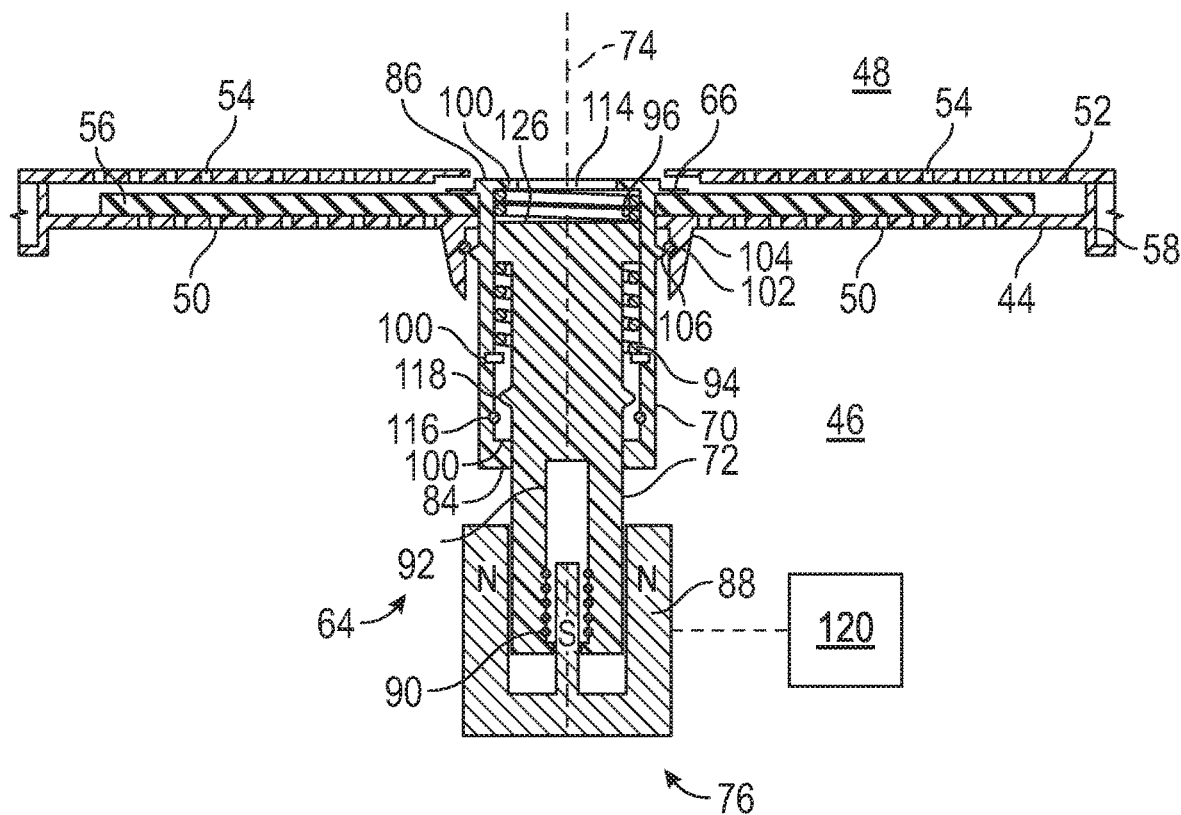
FIG. 5 is a schematic illustration of a third mode of operation of the hydraulic mount assembly.
Figure 3:
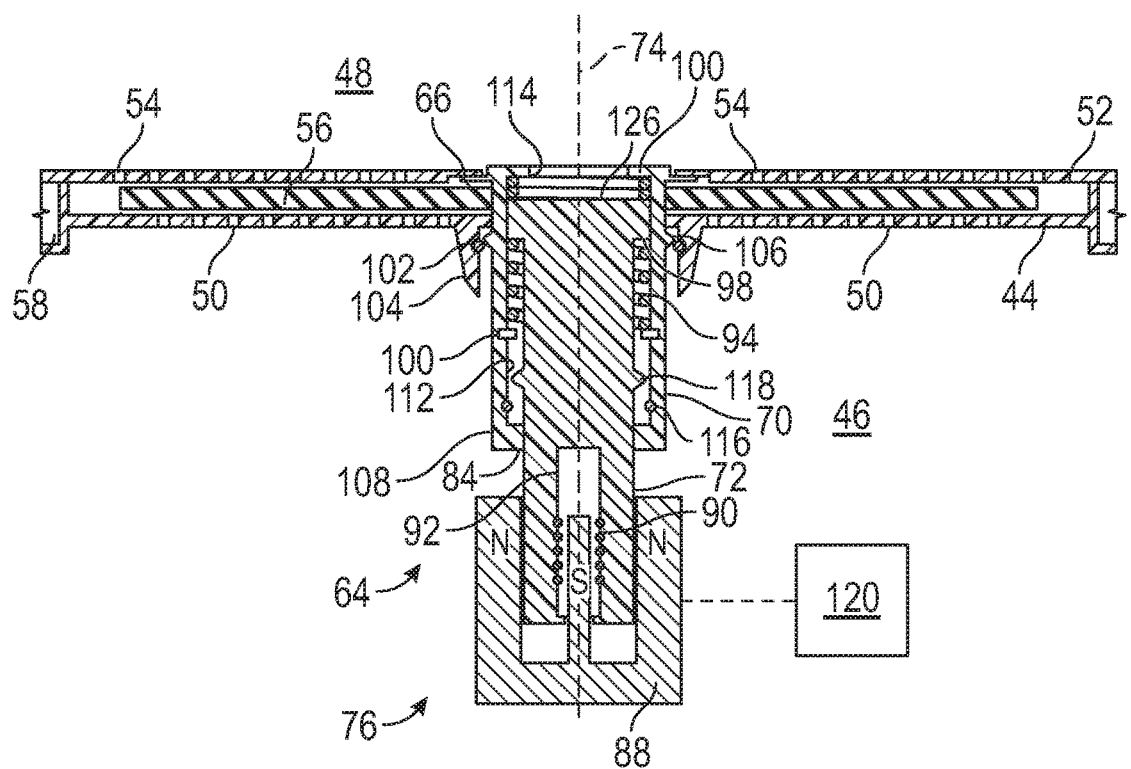
FIG. 3 is a schematic illustration of a first mode of operation of the hydraulic mount assembly.
Figure 4:
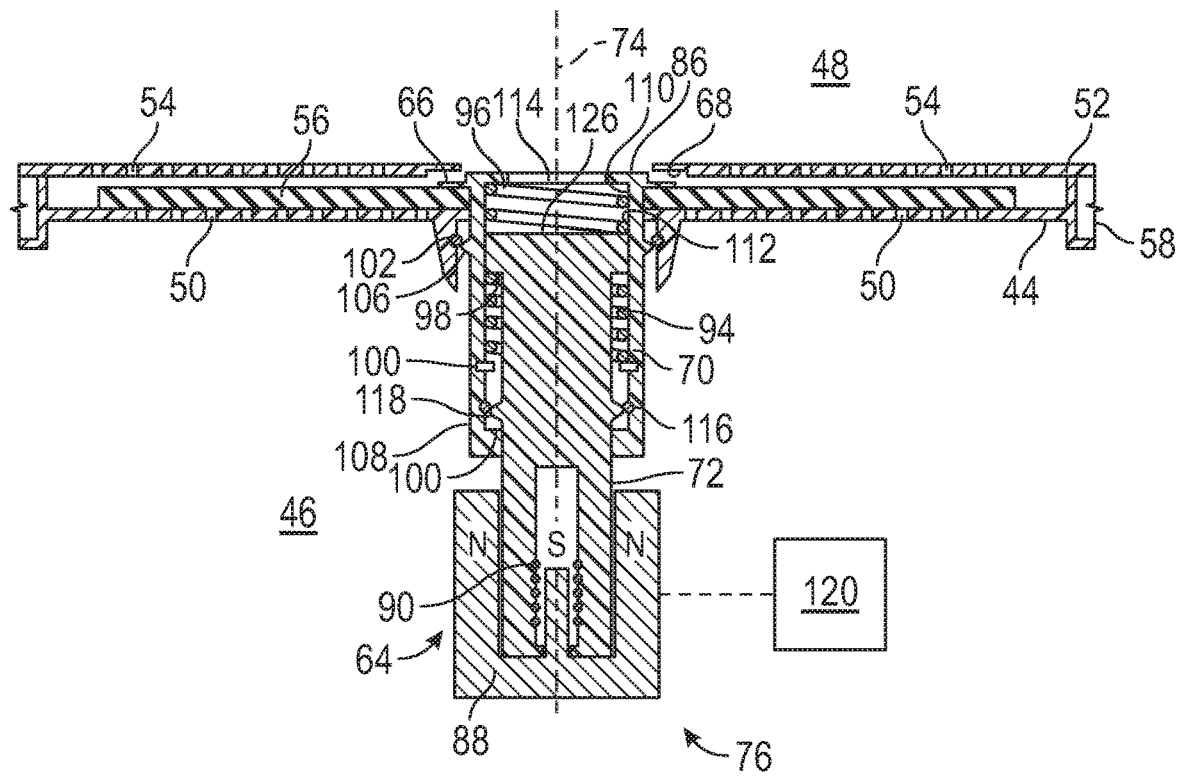
FIG. 4 is a schematic illustration of a second mode of operation of the hydraulic mount assembly.

Referring to FIGS. 3-5, the hydraulic mount assembly 12 also includes a first plate 44 fixed relative to the mount body 38 inside the cavity 40 to separate the cavity 40 into a first chamber 46 and a second chamber 48. The third portion 45 may form the lower boundary of the first chamber 46, and the first and second portions 41, 43 may form the upper boundary of the second chamber 48. In certain configurations, the first plate 44 is directly or indirectly fixed to the cover 42. The third portion 45 and the first plate 44 may further define the second chamber 48. The first and second chambers 46, 48 contain a fluid, and more specifically a liquid fluid. Therefore, non-limiting examples of the fluid may include an oil, hydraulic fluid, etc. The fluid may pass between the first and second chambers 46, 48 in certain situations due to changing pressure in the respective chambers 46, 48 in order to provide suppression of vibrations.

Generally, when the force is applied to the mount body 38, the first and second chambers 46, 48 may expand and contract depending on different pressures in the chambers 46, 48. For example, when the force is applied to the mount body 38 through the post 47 in one direction, the first and second portions 41, 43 may cause the first chamber 46 to decrease in size which forces the fluid out of the first chamber 46 and into the second chamber 48 which increases the size of the second chamber 48. As another example, when the force is applied to the mount body 38 in an opposite direction, the first and second portions 41, 43 may cause the second chamber 48 to decrease in size which forces the fluid out of the second chamber 48 and into the first chamber 46 to increase in size.

It is to be appreciated that the hydraulic mount assembly 12 may be configured as a single-action mount body or a dual-action mount body. For illustrative purposes the single-action mount body is illustrated in FIG. 2. In the dual-action mount body, the third portion 45, i.e., the bladder, is replaced with a stiffer structure, such as the structure for the first and second portions 41, 43. Therefore, in the dual-action mount body, the structure that forms the upper boundary of the cavity 40 and the post 47 may be mirrored to the location of the bladder.

As best shown in FIGS. 3-5, the first plate 44 defines a plurality of first passages 50 that fluidly connects the first and second chambers 46, 48. Furthermore, the hydraulic mount assembly 12 may also include a second plate 52 fixed relative to the mount body 38 inside the cavity 40 to further separate the cavity 40 into the first and second chambers 46, 48. In certain configurations, the second plate 52 is directly or indirectly fixed to the cover 42. The first and second portions 41, 43 and the second plate 52 may further define the first chamber 46. The second plate 52 defines a plurality of second passages 54 that fluidly connects the first and second chambers 46, 48.

Referring to FIGS. 2-5, the first and second plates 44, 52 are spaced from each other to define an intermediate chamber 55 (55 numbered in FIG. 2). The hydraulic mount assembly 12 further includes a decoupler 56 disposed between the first chamber 46 and the second chamber 48. In certain configurations, the decoupler 56 is disposed between the first and second plates 44, 52. As such, in certain configurations, the decoupler 56 is disposed in the intermediate chamber 55 between the first and second plates 44, 52. Generally, the decoupler 56 overlaps the first plate 44. More specifically, the decoupler 56 overlaps the first passages 50. Various features of the hydraulic mount assembly 12 may be rearranged such that the decoupler 56 may overlap the second plate 52, and more specifically, overlap the second passages 54. The decoupler 56 operates to prevent fluid flow to the first and second chambers 46, 48 via the first and second plates 44, 52 in certain situations.

As discussed further below, in certain situations, the decoupler 56 is free to move relative to the first and second plates 44, 52 within the intermediate chamber 55, which allows fluid communication between the first and second passages 50, 54 via the intermediate chamber 55, in which the fluid displaces the decoupler 56 without causing any appreciable hydraulic action through the first and second chambers 46, 48. It is to be appreciated that the flow of the fluid around the outer edge of the decoupler 56 may be small. Therefore, the decoupler 56 is displaceable in the intermediate chamber 55 during fluid communication between the first and second chambers 46, 48 via the first and second passages 50, 54. When the decoupler 56 is free to move back and forth relative to the first and second plates 44, 52, this generally causes pressure in the first and second chambers 46, 48 to substantially equalize.

In other situations, as discussed further below, the decoupler 56 is locked onto the first plate 44 which prevents fluid communication between the first and second passages 50, 54; and in this situation, hydraulic action occurs between the first and second chamber 46, 48 through an inertia track 58 (see FIG. 2). The inertia track 58 is disposed between the mount body 38 and the first plate 44. The inertia track 58 defines a passageway 60 that forms a track between the first and second chambers 46, 48. The passageway 60 is separate from the first passages 50 and the second passages 54. The passageway 60 allows the fluid to flow between the first and second chambers 46, 48 via the inertia track 58. The passageway 60 generally forms a ring which causes the fluid to travel circularly or spirally through the inertia track 58 until the fluid reaches a port 62. For example, there may be one port 62 in direct communication with the first chamber 46 and another port 62 in direct communication with the second chamber 48. When the decoupler 56 is locked onto the first plate 44, a greater pressure occurs in one of the first and second chambers 46, 48 as compared to the other one of the first and second chambers 46, 48. The flow of the fluid through the inertia track 58, when considered with the dynamic volumetric expansion and compression of the first and second chambers 46, 48, arises from the presences of pressure differences between the first and second chambers 46, 48. The pressure differences in the chambers 46, 48 act on an effective termination area (the effective termination area is the effective area that pressure is exerted in the respective first and second chambers 46, 48 to produce forces at the connection ends, and the connection ends here are the powertrain 10 and the structure 36) of the respective powertrain 10 and the structure 36 which creates a dynamic force between the powertrain 10 and the structure 36. The dynamic force may be of sufficient magnitude and proper polarity to suppress vibrations in the body 16 of the vehicle 14 from other sources. Various features of the hydraulic mount assembly 12 may be rearranged such that the decoupler 56 may overlap the second plate 52, and more specifically, overlap the second passages 54, and in this configuration, the decoupler 56 may lock onto the second plate 52 instead of the first plate 44, and operate similar to the discussion above, and therefore, will not be repeated.

Continuing with FIGS. 2-5, the hydraulic mount assembly 12 also includes an actuator 64 coupled to the first plate 44. The actuator 64 is operable in a first mode, a second mode and a third mode. Operation of the actuator 64 provides an active system to minimize vibrations in the body 16 of the vehicle 14 through the hydraulic mount assembly 12. Said differently, the hydraulic mount assembly 12 is actively adjustable in response to the actuator 64 to minimize vibrations to the passenger compartment 18. For example, depending on the road conditions, the hydraulic mount assembly 12 may be adjusted via the actuator 64 to maximize vibration suppression. The actuator 64 may be referred to as a voice coil actuator.

The first mode is illustrated in FIG. 3, and may also be referred to an idle mode in which the prime mover 22 is running but the vehicle 14 is not moving. Therefore, in the first mode, vibrations in the body 16 occur at a minimal level. With regard to the electric or hybrid vehicle application, when the vehicle 14 is in the idle mode, the prime mover 22 may be off, and thus no vibrations may occur internally in the vehicle 14.

The second mode is illustrated in FIG. 4, and may also be referred to as a rough road mode in which the road 34 has recesses or bumps that oscillate the vehicle 14 as the vehicle 14 travels over the bumps. Therefore, in the second mode, vibrations in the body 16 occur at an appreciable level, but this level of vibrations is managed via the hydraulic action of the fluid moving through the inertia track 58.

The third mode is illustrated in FIG. 5, and may also be referred to as a smooth road shake mode in which the road 34 has minimal recesses or bumps (such as a smooth asphalt or paved road 34 without potholes) that oscillates the vehicle 14 in a periodic pattern related to a frequency produced due to rotation of the wheels 28. The vibration level of the third mode is less than the second mode As will be discussed further below, information from the sensors 32 at the wheels 28 is used to determine whether the actuator 64 should operate in the first mode, the second mode, or the third mode.

The decoupler 56 is movable between a locked position (see FIGS. 4 and 5) and an unlocked position (see FIG. 3) in response to actuation of the actuator 64. Therefore, depending on which mode the actuator 64 is operating in, the decoupler 56 may allow fluid communication through the first passages 50 or prevent fluid communication through the first passages 50.

Generally, the decoupler 56 is in the locked position when the actuator 64 is in the second or rough road mode or the third or smooth road shake mode because there are forces occurring between the dynamic mass 21 and/or the prime mover 22 and the structure 36 by which vibrations of the body 16 and the passenger compartment 18 may be suppressed. The decoupler 56 abuts the first plate 44 when in the locked position to prevent fluid communication through the first passages 50. When the decoupler 56 is in the locked position, hydraulic action occurs between the first and second chambers 46, 48 through the inertia track 58, thus damping vibrations between the powertrain 10 and the structure 36, and/or damping vibrations to the passenger compartment 18.

Generally, the decoupler 56 is in the unlocked position when the actuator 64 is in the first or idle mode when there are minimal forces occurring between the prime mover 22 and the structure 36 in response to excitation sources, such as, operation of the prime mover 22. The vibrations that may occur when in the first mode due to idling of the prime mover 22 are generally small in amplitude and the decoupler 56 is movable between the plates 44, 52 to displace the fluid in the intermediate chamber 55 to the respective chambers 46, 48, and thus, reduce transmission of the vibrations from the prime mover 22 to the passenger compartment 18 via fluctuation of the decoupler 56 and not the flow of fluid through the inertia track 58. The decoupler 56 is movable relative to the first plate 44 when in the unlocked position to allow fluid communication through the first passages 50. Therefore, when the decoupler 56 is in the unlocked position, the decoupler 56 is free to move relative to the first plate 44 and the second plate 52 inside the intermediate chamber 55. The decoupler 56 allows fluid communication between the first and second passages 50, 54 via the intermediate chamber 55 when the decoupler 56 is in the unlocked position. As such, the decoupler 56 is disposed in the unlocked position to allow a degree of free movement of the decoupler 56 between the first and second plates 44, 52, which may occur when the actuator 64 is in the first mode. When the decoupler 56 is in the unlocked position, no appreciable hydraulic action occurs between the first and second chambers 46, 48 via the inertia track 58, and pressure is substantially equalized between the first and second chambers 46, 48. Therefore, movement of the fluid occurs through the first and second passages 50, 54 when the decoupler 56 is free to move between the first and second plates 44, 52, but minimal movement of the fluid occurs through the inertia track 58 when in the first mode. This movement of the decoupler 56 reduces transmissibility of small displacement vibrations.

Next, the details of the actuator 64 will be addressed. FIGS. 2-5 illustrate features of the actuator 64, among other features. It is to be appreciated that FIGS. 3-5 are schematic illustrations to show various features more clearly.

Turning to FIGS. 2-5, in certain configurations, the actuator 64 may include a flange 66 that overlaps a portion of the decoupler 56. The flange 66 may be disposed between the decoupler 56 and the second plate 52. The flange 66 is movable to pinch the decoupler 56 between the flange 66 and the first plate 44 when the decoupler 56 is in the locked position. Optionally, the second plate 52 may define a pocket 68 (see FIG. 2) to contain the flange 66. It is to be appreciated that the flange 66 may be any suitable length that overlaps the decoupler 56 in order to abut the decoupler 56 to the first plate 44 when the decoupler 56 is in the locked position. Furthermore, the flange 66 may be any suitable configuration and any suitable number of flanges 66 may be used, and non-limiting examples may include a disk, a plurality of spaced apart flanges of the same or different lengths, etc.

Referring to FIGS. 2-5, the actuator 64 may also include a casing 70 and a plug 72 disposed in the casing 70. Generally, the casing 70 is surrounded by the first and second plates 44, 52 and the decoupler 56. Therefore, the plug 72 is also surrounded by the first and second plates 44, 52 and the decoupler 56. Both of the casing 70 and the plug 72 are movable depending on actuation of the actuator 64. The plug 72 and the casing 70 are movable relative to the first and second plates 44, 52. In certain situations, the plug 72 and the casing 70 are movable independently of each other.

Generally, the flange 66 extends outwardly from the casing 70 to overlap the portion of the decoupler 56. Therefore, the flange 66 may be fixed to the casing 70, and thus, the flange 66 and the casing 70 are movable together as a unit. The casing 70 and the flange 66 are movable relative to the first and second plates 44, 52 during actuation of the actuator 64.

The casing 70 is movable between an initial position (see FIG. 3) and a secondary position (see FIGS. 4 and 5). As best shown by comparing FIGS. 3-5, the initial position and the secondary position of the casing 70 are different from each other. When the casing 70 is in the initial position, the flange 66 is positioned closer to the second plate 52 than to the first plate 44 which allows the degree of free movement of the decoupler 56 between the first and second plates 44, 52. When the casing 70 is in the secondary position, the flange 66 pinches the decoupler 56 to the first plate 44. The casing 70 is movable relative to the first plate 44 depending on whether the actuator 64 is operating in the first mode, the second mode, or the third mode.

Turning to the plug 72, the plug 72 is movable between a first position (see FIG. 3), a second position (see FIG. 4) and a third position (see FIG. 5). Generally, the plug 72 is movable between the first, second, and third positions along a longitudinal axis 74. As best shown by comparing FIGS. 3-5, the first, second, and third positions of the plug 72 are different from each other relative to the casing 70. The plug 72 is movable relative to the casing 70 depending on whether the actuator 64 is operating in the first mode, the second mode, or the third mode.

Referring to FIGS. 2-5, the actuator 64 may further include a magnetic apparatus 76 that cooperates with the plug 72. Actuation of the actuator 64 energizes the magnetic apparatus 76 which causes the plug 72 to move to one of the first position, the second position, and the third position. Part of the magnetic apparatus 76 may be fixed relative to the first plate 44 and another part of the magnetic apparatus 76 may be secured to the plug 72.

Specifically, the first plate 44 may include a wall 78 that extends into the first chamber 46 away from the second plate 52, and the wall 78 generally surrounds the casing 70 and the plug 72. Furthermore, the wall 78 may be spaced from and surround the longitudinal axis 74.

The magnetic apparatus 76 may include a cap 80 secured to the wall 78 to enclose part of the casing 70 and the plug 72 in a sub-chamber 82. The sub-chamber 82 also contains the fluid. For example, the casing 70 may include a first end 84 and a second end 86 spaced from each other relative to the longitudinal axis 74, and the first end 84 may face the cap 80 and be spaced from the cap 80. The first end 84 of the casing 70 may be open. The flange 66 may be disposed closer to the second end 86 of the casing 70 than to the first end 84 of the casing 70.

As best shown in FIGS. 2-5, the magnetic apparatus 76 may include one or more magnets 88 or magnetic material 88, that are supported by the cap 80, and the magnetic apparatus 76 may include one or more coils 90 supported by the plug 72. Alternatively, the magnet(s) 88/the magnetic material 88 may be supported by the plug 72, and the coils 90 supported by the cap 80. Regardless of which part the magnet(s) 88 and the coils 90 are attached to, actuation of the actuator 64 causes current to flow through the coils 90 which magnetically interacts with the magnets 88 which cause the plug 72 to move to one of the first, second, and third positions. As one non-limiting example, as shown in FIGS. 3-5 a north pole (N) of the magnet 88 may surround the plug 72 and a south pole (S) of the magnet 88 may be disposed inside the plug 72 such that the coils 90 of the plug 72 surround the south pole (S). It is to be appreciated that the magnets 88 may be placed such that the poles are reversed (for example, the south pole (S) disposed outside of the plug 72 and the north pole (N) inside the plug 72) in the FIGS., and generally, the magnets 88 may be placed in any suitable orientation, and the FIGS. are non-limiting examples.

In certain configurations, the plug 72 may define an orifice 92 that receives part of the magnet 88, such as the part of the magnet 88 that creates the south pole (S) is disposed in the orifice 92. Additionally, the coils 90 may be secured to the plug 72 inside the orifice 92, and therefore, the coils 90 and the plug 72 may move as a unit. It is to be appreciated that the fluid may be disposed inside the orifice 92.

As best shown in FIGS. 2-5, the actuator 64 may include a first biasing member 94 and a second biasing member 96 coupled to the plug 72 which centers the plug 72 relative to the casing 70 when the plug 72 is unlocked from the casing 70. Generally, the first and second biasing members 94, 96 apply a biasing force to the plug 72 in opposite directions which positions the plug 72 in a central position. The amount of biasing force that the first and second biasing members 94, 96 apply to the plug 72 may be the same or different depending on the desired application. The first and second biasing members 94, 96 may be any suitable configuration, and non-limiting examples may include a spring, etc.

Continuing with FIGS. 2-5, the plug 72 may include a lip 98, with the first biasing member 94 disposed along one side of the lip 98 and the second biasing member 96 disposed along another side of the lip 98. Furthermore, the casing 70 may include one or more stops 100 to provide one or more surfaces for the first and second biasing members 94, 96 to react against. The stops 100 also prevent the plug 72 from separating from the casing 70 during the energization of the magnetic apparatus 76.

The first plate 44, the casing 70, and the plug 72 may include some additional features to position the casing 70 and the plug 72 in a desired orientation in response to energizing the magnetic apparatus 76. When the magnetic apparatus 76 is de-energized, the additional features maintain the general orientation of the casing 70, and depending on the situation, the plug 72, which will be explained further below. Once the desired mode is selected, in certain situations, such as the first and third modes, the magnetic apparatus 76 may be energized/de-energized to produce a magnetic force via the magnets 88 and the coils 90 that is continuously varied to apply a controlled force to the plug 72. The plug 72 may be actively movable via the magnetic apparatus 76 when the actuator 64 is in the first mode or the third mode.

A controller 120 (discussed in detail below) may be in communication with the magnetic apparatus 76, and the controller 120 may use information regarding a pressure differential between the first and second chambers 46, 48 and the magnetic force from energizing the magnetic apparatus 76 to control active movement of the plug 72. This dynamic action of the plug 72 may suppress targeted periodic vibrations at a predetermined frequency of rotation of the wheels 28 or the periodic rotation frequency of the dynamic mass 21 and/or prime mover 22, which will also be discussed further below.

Continuing with FIGS. 2-5, the first plate 44 may include a first detent 102 which may protrude outwardly toward the casing 70. In certain configurations, the first detent 102 faces the casing 70 and surrounds the casing 70. The first detent 102 may be fixed to the first plate 44, and thus, may remain stationary with the first plate 44. Furthermore, the first detent 102 may be any suitable configuration and one non-limiting example of the first detent 102 may include an o-ring, a clip, a ring, a structure machined into the first plate 44, a molding structure that is integral with the first plate 44, any structure that protrudes outwardly, etc. Furthermore, the first detent 102 may be continuous about the first plate 44 or a plurality of first detents 102 may be spaced apart from each other about the first plate 44.

Optionally, the first plate 44 may include a strip 104 that surrounds the casing 70, and the first detent 102 may be fixed to the strip 104. The strip 104 may be disposed between the wall 78 and the casing 70.

Continuing with FIGS. 2-5, the casing 70 may include a first protrusion 106 which may protrude outwardly toward the inertia track 58. More specifically, the casing 70 may include an outer surface 108, and the first protrusion 106 may protrude outwardly from the outer surface 108. The outer surface 108 may face away from the longitudinal axis 74. Furthermore, the outer surface 108 may be spaced from and surround the longitudinal axis 74. The flange 66 may also extend outwardly from the outer surface 108.

The first protrusion 106 may be fixed to the outer surface 108 of the casing 70, and thus, the first protrusion 106 and the casing 70 are movable together as a unit. Additionally, the first protrusion 106 faces the first detent 102. The first protrusion 106 is movable with the casing 70 relative to the first detent 102 of the first plate 44 depending on actuation of the actuator 64. Generally, the first protrusion 106 of the casing 70 is movable across the first detent 102 of the first plate 44 between the initial position and the secondary position. The first protrusion 106 may be any suitable configuration and one non-limiting example of the first protrusion 106 may include an o-ring, a clip, a ring, a structure machined into the casing 70, a molding structure that is integral with the casing 70, any structure that protrudes outwardly, etc. Furthermore, the first protrusion 106 may be continuous about the casing 70 or a plurality of first protrusions 106 may be spaced apart from each other about the casing 70.

Referring to FIG. 3, the first protrusion 106 of the casing 70 is disposed between the decoupler 56 and the first detent 102 when the casing 70 is in the initial position. Specifically, the first protrusion 106 is sandwiched between part of the first plate 44 and the first detent 102. In this position, the flange 66 allows the decoupler 56 to move between the first and second plates 44, 52 when the casing 70 is in the initial position.

Specifically, referring to FIG. 3, when the actuator 64 is actuated to operate in the first mode, the magnetic apparatus 76 is energized to move the plug 72 to the first position which correspondingly moves the flange 66 of the casing 70 toward the second plate 52 and moves the first protrusion 106 of the casing 70 between the first detent 102 and the decoupler 56. The magnetic apparatus 76 is energized with a strong magnetic force or action that causes the plug 72 to apply a force to the casing 70 to move the casing 70 to the initial position. Therefore, the casing 70 is locked to the first plate 44 in the initial position. When the magnetic apparatus 76 is de-energized, the casing 70 remains locked in the initial position due to the position of the first protrusion 106 relative to the first detent 102. Also, when the magnetic apparatus 76 is de-energized, the plug 72 generally returns to the central position because the plug 72 is not locked when in the first mode. While the plug 72 is unlocked or generally in the central position but the plug 72 is to be actively movable in the first mode, then the casing 70 is locked in the secondary position to lock the decoupler 56 in the locked position, and the magnetic apparatus 76 may be energized to apply a controlled continuous or varied force to the plug 72 via the amount of the current being delivered through the coils 90, which causes fluctuation of the plug 72 during the first mode. This dynamic or active action of the plug 72 may suppress targeted periodic vibrations at a predetermined frequency of rotation of the internal components of the prime mover 22 when in the first mode since the wheels 28 are not moving.

Referring to FIGS. 4 and 5, the first protrusion 106 of the casing 70 is movable over the first detent 102 away from the decoupler 56 when the casing 70 is in the secondary position. Therefore, the casing 70 is now locked to the first plate 44 in a different position. The flange 66 pinches the decoupler 56 to the first plate 44 when the casing 70 is in the secondary position.

Specifically, referring to FIGS. 4 and 5, when the actuator 64 is actuated to switch to the second or third modes, the magnetic apparatus 76 is energized to move the plug 72 to the second or third positions which correspondingly move the flange 66 of the casing 70 toward the first plate 44 such that the first protrusion 106 of the casing 70 passes over the first detent 102 away from the decoupler 56. The magnetic apparatus 76 is energized with a strong magnetic force or action that causes the plug 72 to apply a force to the casing 70 in an opposite direction from the first mode (when the casing 70 is in the initial position), to move the casing 70 to the secondary position. Therefore, the casing 70 is locked to the first plate 44 in the secondary position. When the magnetic apparatus 76 is de-energized, the casing 70 remains in the secondary position due to the position of the first protrusion 106 relative to the first detent 102. When the magnetic apparatus 76 is de-energized, the plug 72 generally returns to the central position because the plug 72 is not locked when in the third mode, but will not return to the central position when in the second mode which is discussed further below. While the plug 72 is unlocked or generally in the central position, the magnetic apparatus 76 may be energized to apply the controlled continuous or varied force to the plug 72 via the amount of the current being delivered through the coils 90, which causes fluctuation of the plug 72 during the third mode. This dynamic or active action of the plug 72 may suppress targeted vibrations at the periodic frequency produced due to rotation of the wheels 28 when in the third mode.

Referring back to FIGS. 2-5, the casing 70 may define an opening 110 that is surrounded by an inner surface 112 of the casing 70. The plug 72 is disposed inside or housed within the opening 110. The inner surface 112 may face the longitudinal axis 74 and is spaced from the longitudinal axis 74. Furthermore, the outer surface 108 surrounds the inner surface 112 and the opening 110. The outer surface 108 of the casing 70 and the inner surface 112 of the casing 70 oppose each other. Part of the plug 72 is disposed in the opening 110 and is movable relative to the inner surface 112 inside the opening 110 between the first, second, and third positions. Another part of the plug 72 is disposed outside of the casing 70 to interact with the magnetic apparatus 76, and specifically, interact with the magnet 88 of the magnetic apparatus 76. The opening 110 may be open to the subchamber 82 and the second chamber 48, and thus, the fluid may be disposed in the opening 110.

The lip 98 of the plug 72 may engage the inner surface 112 of the casing 70. Therefore, for example, when the plug 72 moves toward the second end 86 of the casing 70, some of the fluid may be pushed into the second chamber 48 through a slot 114 proximal to one of the stops 100 of the casing 70. As another example, when the plug 72 moves toward the first end 84 of the casing 70, by active control or through action of the pressure differential between the first and second chambers 46, 48, some of the fluid may be pulled into the opening 110 through the slot 114, and thus, pushes some of the fluid out of the second chamber 48.

Continuing with FIGS. 2-5, the inner surface 112 of the casing 70 may include a second protrusion 116 which may protrude outwardly toward the plug 72. In certain configurations, the second protrusion 116 faces the longitudinal axis 74. The first and second protrusions 106, 116 of the casing 70 are offset from each other relative to the longitudinal axis 74. For example, the first protrusion 106 may be disposed closer to the decoupler 56 than the second protrusion 116 is to the decoupler 56. Said differently, the second protrusion 116 is disposed closer to the magnetic apparatus 76 than the first protrusion 106 is to the magnetic apparatus 76. The second protrusion 116 may be fixed to the inner surface 112 of the casing 70, and thus, the casing 70 and the second protrusion 116 are movable together as a unit.

The second protrusion 116 may be any suitable configuration and one non-limiting example of the second protrusion 116 may include an o-ring, a clip, a ring, a structure machined into the casing 70, a molding structure that is integral with the casing 70, any structure that protrudes outwardly, etc. Furthermore, the second protrusion 116 may be continuous about the casing 70 or a plurality of second protrusions 116 may be spaced apart from each other about the casing 70.

Continuing with FIGS. 2-5, the plug 72 may include a second detent 118 which may protrude outwardly toward the inner surface 112 of the casing 70. Generally, the second detent 118 of the plug 72 is disposed on one side of the second protrusion 116 when the plug 72 is in the first and third positions, and the second detent 118 of the plug 72 is disposed on another side of the second protrusion 116 when the plug 72 is in the second position. The second detent 118 of the plug 72 is disposed between the decoupler 56 and the second protrusion 116 when the plug 72 is in the first and third positions. The second detent 118 of the plug 72 is movable over the second protrusion 116 away from the decoupler 56 when the plug 72 is in the second position.

The second detent 118 may be any suitable configuration and one non-limiting example of the second detent 118 may include an o-ring, a clip, a ring, a structure machined into the plug 72, a molding structure that is integral with the plug 72, any structure that protrudes outwardly, etc. Furthermore, the second detent 118 may be continuous about the plug 72 or a plurality of second detent 118 may be spaced apart from each other about the plug 72. It is to be appreciated that the first and second protrusions 106, 116 may be the same configurations or different configurations relative to each other, and additionally, the first and second detents 102, 118 may be the same configurations or different configurations relative to each other. In the FIGS., for illustrative purposes, the first detent 102 and the second protrusion 116 have generally the same configuration relative to each other and the first protrusion 106 and the second detent 118 have generally the same configuration relative to each other.

As discussed above, operation of the hydraulic mount assembly 12 is an active system. Therefore, depending on the road conditions and/or vehicle situation, the actuator 64 may be operated in one of the modes in order to reduce or minimize vibrations felt in the passenger compartment 18. The controller 120 may be used to control the operation of the actuator 64 in order to reduce or minimize vibrations felt in the passenger compartment 18. The controller 120 may be in electrical communication with the actuator 64, and more specifically, with the magnetic apparatus 76. The controller 120 may also collect and/or use information regarding the pressure differential between the first and second chambers 46, 48 and the magnetic force from energizing the magnetic apparatus 76 to control dynamic/active movement of the plug 72.

Therefore, for example, the controller 120 may control and monitor which mode the actuator 64 is operating in, e.g., the first mode, the second mode, and the third mode. Additionally, the controller 120 may control and monitor the magnetic apparatus 76 to cause fluctuation of the plug 72 during the first mode due to the periodic rotation frequency of the prime mover 22 and during the third mode due to the periodic vibrations at the predetermined frequency of rotation of the wheels 28. Simply stated, in certain situations, the magnetic apparatus 76 may be energized to change the amount of the current through the coils 90 which changes the magnetic force or action that causes dynamic/active movement of the plug 72. The controller 120 may also be in electrical communication with the sensors 32 at the wheels 28 either directly or through a controller area network (CAN) system, and/or may also be in electrical communication with a sensor in the first and second chambers 46, 48 to determine/collect/monitor/use the pressure differential between the chambers 46, 48. The controller 120 may use the information gathered by the sensors 32 at the wheels 28 and/or sensors of the chambers 46, 48, and/or information gathered via the CAN system, to determine the mode of operation of the actuator 64, e.g., the first mode, the second mode, and the third mode, as well as determine whether the plug 72 should be dynamically/actively moved.

Instructions may be stored in a memory 122 of the controller 120 and automatically executed via a processor 124 of the controller 120 to provide the respective control functionality. Said differently, the controller 120 is configured to execute the instructions from the memory 122, via the processor 124. For example, the controller 120 may be a host machine or distributed system, e.g., a computer such as a digital computer or microcomputer, and, as the memory 122, tangible, non-transitory computer-readable memory such as read-only memory (ROM) or flash memory. The controller 120 may also have random access memory (RAM), electrically erasable programmable read-only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the controller 120 may include all software, hardware, memory 122, algorithms, connections, sensors, etc., necessary to control and monitor the actuator 64, control and monitor the pressure differential between the chambers 46, 48, and receive and monitor information from the sensors 32 at the wheels 28. As such, a control method operative to control/monitor the actuator 64 and receive/ monitor information from the sensors 32 at the wheels 28 and the pressure differential between the chambers 46, 48 may be embodied as software or firmware associated with the controller 120. It is to be appreciated that the controller 120 may also include any device capable of analyzing data from various sensors, comparing data, making the necessary decisions required to control/monitor the actuator 64, control/monitor the pressure differential, and receive/monitor the sensors 32 at the wheels 28. Optionally, more than one controller 120 may be utilized.

For illustrative purposes, each of the modes of operations of the actuator 64, and the positions of the plug 72 and the casing 70, are discussed below for the hydraulic mount assembly 12. Again, the controller 120 determines when to switch between the modes based on, for example, information from the sensors 32 at the wheels 28 or any other desired information.

Referring to FIG. 3, when the actuator 64 is actuated to operate in the first mode or idle mode, there is no appreciable hydraulic action causing the fluid to move between the first and second chambers 46, 48 (via the inertia track 58) because there are minimal vibrational forces between the dynamic mass 21 and the structure 36 or between the road 34 and the dynamic mass 21.

The magnetic apparatus 76 is energized to move the plug 72 to the first position which correspondingly moves the flange 66 of the casing 70 toward the second plate 52 and moves the first protrusion 106 of the casing 70 between the first detent 102 and the decoupler 56. The plug 72 initially moves to the first position to apply a force to the casing 70 to move the casing 70 to the initial position. Specifically, when the plug 72 is in the first position, movement of the plug 72 forces the casing 70 toward the second chamber 48 such that a distal end 126 of the plug 72 is disposed adjacent to the second end 86 (86 numbered, for example, in FIG. 2) of the casing 70. Hence, the plug 72 pushes the casing 70 toward the second plate 52. In this mode, the casing 70 is mechanically locked to the first plate 44 in the initial position via the first detent 102, and remains mechanically locked when the magnetic apparatus 76 is de-energized. In other words, the first protrusion 106 of the casing 70 is sandwiched between part of the first plate 44 and the first detent 102 of the first plate 44.

The decoupler 56 is disposed in the unlocked position to allow the degree of free movement of the decoupler 56 between the first and second plates 44, 52 when the actuator 64 is in the first mode, which corresponds to the plug 72 being in the first position to move the casing 70 to the initial position. The decoupler 56 may flutter between the first and second plates 44, 52 when in the unlocked position due to the low vibrations produced by the prime mover 22 during operation at idle. Also, when the actuator 64 is in the first mode, the second detent 118 of the plug 72 is disposed between the decoupler 56 and the second protrusion 116 such that the plug 72 is mechanically unlocked from the casing 70 when in the first position. Therefore, when the magnetic apparatus 76 is de-energized in the first mode, the plug 72 is allowed to bias to the central position in response to the first and second biasing members 94, 96 since the plug 72 is not mechanically locked to the casing 70.

The plug 72 may be actively movable relative to the casing 70 via the magnetic apparatus 76 when the plug 72 is unlocked from the casing 70 in the first mode. If the plug 72 is to be actively moved in the first mode, then the decoupler 56 is moved to the locked position. Furthermore, in this mode, while the casing 70 is locked to the first plate 44 and the decoupler 56 is locked, the magnetic apparatus 76 may then be activated to control the amount of the current to the coils 90 to actively move the plug 72 relative to the casing 70 in order to reduce vibrations at the periodic frequency of the prime mover 22. The plug 72 responds to the active control, and the movement of the plug 72 causes displacement of the fluid through the slot 114 which changes the pressure accordingly in the first and second chambers 46, 48. For the first mode, the controller 120 may communicate with a crankshaft position sensor to track the periodic movement of the prime mover 22, and the controller 120 determines how much the plug 72 should fluctuate. Additionally, the controller 120 may use information regarding the pressure differential between the first and second chambers 46, 48 and the magnetic force from energizing the magnetic apparatus 76 to control active movement of the plug 72 while the actuator 64 is in the first mode.

Referring to FIG. 4, when the actuator 64 is actuated to operate in the second mode or rough road mode, there is hydraulic action causing the fluid to move between the first and second chambers 46, 48 (via the inertia track 58) because there is relative movement between the dynamic mass 21 and/or the prime mover 22 and the structure 36. There is generally a large displacement of the fluid from the second chamber 48 to the first chamber 46 in this mode. The magnetic apparatus 76 is energized to move the plug 72 to the second position which correspondingly moves the flange 66 of the casing 70 toward the first plate 44 such that the casing 70 is in the secondary position. The second detent 118 of the plug 72 engages the casing 70 to move the casing 70 in the opposite direction from the initial position in the idle mode.

When the actuator 64 is in the second mode, the casing 70 is in the secondary position which disposes the first protrusion 106 of the casing 70 farther away from the decoupler 56 as compared to when the plug 72 is in the first position. When the casing 70 is in the secondary position, the first detent 102 of the first plate 44 is disposed between the first protrusion 106 of the casing 70 and the decoupler 56. The first protrusion 106 of the casing 70 is movable over the first detent 102 of the first plate 44 away from the decoupler 56 when the casing 70 is in the secondary position. Therefore, the casing 70 is now mechanically locked to the first plate 44 in the secondary position (as compared to the initial position), and remains mechanically locked when the magnetic apparatus 76 is de-energized.

The flange 66 of the casing 70 pinches the decoupler 56 to the first plate 44 when the casing 70 is in the secondary position. Therefore, the decoupler 56 is disposed in the locked position to sandwich the decoupler 56 to the first plate 44 when the actuator 64 is in the second mode, which corresponds to the plug 72 being in the second position to move the casing 70 to the secondary position. The decoupler 56 prevents fluid communication between the first and second passages 50, 54 to the first and second chambers 46, 48, which then causes hydraulic action via the inertia track 58 between the first and second chambers 46, 48 for any relative movement between the mount body 38 and the powertrain 10.

When comparing the first position of the plug 72 to the second position, the plug 72 moves farther away from the decoupler 56 when in the second position. The second detent 118 of the plug 72 is movable over the second protrusion 116 of the casing 70 away from the decoupler 56 when the casing 70 is in the secondary position. Generally, the plug 72 is mechanically locked to the casing 70 when in the second position via the second detent 118, and remains mechanically locked when the magnetic apparatus 76 is de-energized for the second position. In other words, the second detent 118 of the plug 72 is sandwiched between the second protrusion 116 and one of the stops 100 of the casing 70. When the magnetic apparatus 76 is de-energized in the second mode, the plug 72 remains in the second position due to the position of the second detent 118 relative to the second protrusion 116, and thus, the plug 72 is not allowed to return to the central position and is not allowed to be actively controlled in the second mode.

Referring to FIG. 5, when the actuator 64 is actuated to operate in the third mode or smooth road shake mode, there is hydraulic action causing the fluid to move between the first and second chambers 46, 48 (via the inertia track 58) due to the relative movement between the dynamic mass 21 and/or the prime mover 22 and the structure 36. The magnetic apparatus 76 is energized to move the plug 72 to the third position which correspondingly moves the flange 66 of the casing 70 toward the first plate 44 such that the casing 70 is in the secondary position.

When the actuator 64 is in the third mode, the casing 70 is in the secondary position which disposes the first protrusion 106 of the casing 70 farther away from the decoupler 56 as compared to when the plug 72 is in the first position. When the casing 70 is in the secondary position, the first detent 102 of the first plate 44 is disposed between the first protrusion 106 of the casing 70 and the decoupler 56. The first protrusion 106 of the casing 70 is movable over the first detent 102 of the first plate 44 away from the decoupler 56 when the casing 70 is in the secondary position. The second detent 118 of the plug 72 engages the casing 70 to move the casing 70 in the opposite direction from the idle mode. Therefore, the casing 70 is now mechanically locked to the first plate 44 in the secondary position (as compared to the initial position), and remains mechanically locked when the magnetic apparatus 76 is de-energized, and in certain situations, remains mechanically locked when the magnetic apparatus 76 is energized. Once the casing 70 is mechanically locked in the secondary position, the second detent 118 of the plug 72 moves back over the second protrusion 116 of the casing 70 such that the plug 72 may return to the central position.

The flange 66 of the casing 70 pinches the decoupler 56 to the first plate 44 when the casing 70 is in the secondary position. The decoupler 56 is disposed in the locked position to sandwich the decoupler 56 to the first plate 44 when the actuator 64 is in the third mode, which corresponds to the casing 70 being in the secondary position and the plug 72 being in the third position. The decoupler 56 prevents fluid communication between the first and second passages 50, 54 to the first and second chambers 46, 48, which then causes hydraulic action via the inertia track 58 between the first and second chambers 46, 48 for any relative movement between the mount body 38 and the powertrain 10.

When comparing the first position of the plug 72 to the third position, the plug 72 moves away from the decoupler 56 when in the third position. When the actuator 64 is in the third mode, the second detent 118 of the plug 72 is disposed between the decoupler 56 and the second protrusion 116 such that the plug 72 is mechanically unlocked from the casing 70 when in the third position. Specifically, when the plug 72 is in the third position, the distal end 126 of the plug 72 is disposed farther from the second end 86 of the casing 70 as compared to when the plug 72 is in the first position. Therefore, when the magnetic apparatus 76 is de-energized, or energized in certain situations, in the third mode, the plug 72 is allowed to bias to the central position in response to the first and second biasing members 94, 96 since the plug 72 is not mechanically locked to the casing 70.

The plug 72 may be actively movable relative to the casing 70 via the magnetic apparatus 76 when the plug 72 is unlocked from the casing 70 in the third mode. The plug 72 is actively movable via the magnetic apparatus 76 when the actuator 64 is in the third mode while the decoupler 56 remains in the locked position. The plug 72 is also movable in response to the pressure differentials between the first and second chambers 46, 48 when the actuator 64 is in the third mode while the decoupler 56 remains in the locked position. Furthermore, in this mode, while the casing 70 is locked to the first plate 44, the magnetic apparatus 76 may then be activated to control the amount of the current to the coils 90 to actively move the plug 72 relative to the casing 70 in order to target vibrations at the periodic frequency produced due to rotation of the wheels 28. The plug 72 responds to the combined forces of the active control from the actuator 64 and the pressure differentials between the first and second chambers 46, 48. Specifically, the controller 120 is in communication with the magnetic apparatus 76, and the controller 120 may use information regarding the pressure differential between the first and second chambers 46, 48 and the magnetic force from energizing the magnetic apparatus 76 to control active movement of the plug 72 while the actuator 64 is in the third mode. The magnetic force is determined by the amount of the current through the coils 90 of the magnetic apparatus 76. The motion of the plug 72 produces a dynamic voltage across the coils 90. The motion of the plug 72 is responsive to the pressure differential between the first and second chambers 46, 48 and the magnetic force from energizing the magnetic apparatus 76. The dynamic voltage is continuously measured via the controller 120, and the current applied to the coils 90 is controlled via the controller 120. The controller 120 may use calculations to determine the pressure differential between the first and second chambers 46, 48 by using the amount of active movement of the plug 72, the magnetic force from energizing the magnetic apparatus 76, the properties of the coils 90 (which may include the number of windings), the strength of the magnetic field of the magnetic apparatus 76, and the physical properties of the plug 72 and support features. The physical properties of the plug 72 and the support features may include the mass of the plug 72, the area of the plug 72 at the plug's fluid interface, the axial restoring stiffness of the first and second biasing members 94, 96, and damping of the first and second biasing members 94, 96 at the restoring stiffness. The active movement of the plug 72 is derived from the voltage of the actuator 64 and the current applied to the coils 90 by using an electrical impedance of the actuator 64.

Therefore, the actuator 64, such as the voice coil actuator, and the controller 120 cooperate to perform a dual role of causing actuation of the plug 72 and measuring the active motion of the plug 72. The voice coil actuator may include the plug 72 and the magnetic apparatus 76, and the controller 120 is in communication with the voice coil actuator to monitor, calculate, and/or extract information to provide both actuation of the plug 72 and sensing via measuring the velocity of the plug 72 (in other words, measuring the motion of the plug 72 as discussed above). This dual role of the actuator 64 and the controller 120 eliminates the need for an additional, separate sensor, such as motion and pressure sensors, that are common for other actively controlled mount systems. As such, the actuator 64 provides the advantage of reliability and reduction of cost through reduction of parts.

The controller 120 and the voice coil actuator may use all of the information, data, etc., discussed above to provide the dual role. The voice coil actuator may provide proportional or tight-servo control. In other words, the voice coil actuator excels at providing precision control. The voice coil actuator may be a DC linear actuator or a direct-drive linear motor. Therefore, generally, the actuator 64 may cause linear movement of the plug 72 along the longitudinal axis 74.

While the best modes and other embodiments for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A hydraulic mount assembly for a powertrain comprising:
    a mount body defining a cavity;
    a first plate fixed relative to the mount body inside the cavity to separate the cavity into a first chamber and a second chamber;
    a second plate fixed relative to the mount body inside the cavity to further separate the cavity into the first and second chambers;
    wherein the first plate defines a plurality of first passages that fluidly connects the first and second chambers;
    a decoupler disposed between the first chamber and the second chamber, and the decoupler overlaps the first plate;
    an actuator coupled to the first plate, and the actuator includes a casing that is surrounded by the first and second plates and the decoupler;
    wherein the decoupler is movable between a locked position and an unlocked position in response to actuation of the actuator;
    wherein the decoupler abuts the first plate when in the locked position to prevent fluid communication through the first passages, and the decoupler is movable relative to the first plate when in the unlocked position to allow fluid communication through the first passages;
    wherein the actuator includes a flange that extends outwardly from the casing to overlap a portion of the decoupler; and
    wherein the casing and the flange are movable relative to the first and second plates during actuation of the actuator.

2. The assembly as set forth in claim 1:
    wherein the second plate defines a plurality of second passages that fluidly connects the first and second chambers; and
    wherein the decoupler is disposed between the first and second plates, and the decoupler allows fluid communication between the first and second passages when the decoupler is in the unlocked position.

3. The assembly as set forth in claim 2 wherein:
    the actuator is operable in a first mode, a second mode and a third mode;
    the actuator includes a casing and a plug disposed in the casing;
    the decoupler is disposed in the unlocked position to allow a degree of free movement of the decoupler between the first and second plates when the actuator is in the first mode, which corresponds to the plug being in a first position to move the casing to an initial position;
    the decoupler is disposed in the locked position to sandwich the decoupler to the first plate when the actuator is in the second mode, which corresponds to the plug being in a second position to move the casing to a secondary position;
    the decoupler is disposed in the locked position to sandwich the decoupler to the first plate when the actuator is in the third mode, which corresponds to the casing being in the secondary position and the plug being in a third position; and
    the initial position and the secondary position of the casing are different from each other.

4. The assembly as set forth in claim 3 wherein the actuator includes a magnetic apparatus that cooperates with the plug, and actuation of the actuator energizes the magnetic apparatus which causes the plug to move to one of the first position, the second position and the third position.

5. The assembly as set forth in claim 4 wherein:
    the casing includes a first protrusion;
    the casing includes an outer surface and the first protrusion protrudes outwardly from the outer surface;
    the first plate includes a first detent;
    the first protrusion of the casing is disposed between the decoupler and the first detent when the casing is in the initial position;
    the first protrusion of the casing is movable over the first detent away from the decoupler when the casing is in the secondary position;
    the casing defines an opening that is surrounded by an inner surface of the casing;
    the plug is disposed in the opening and movable relative to the inner surface between the first, second, and third positions;
    the inner surface of the casing includes a second protrusion;
    the plug includes a second detent;
    the second detent of the plug is disposed between the decoupler and the second protrusion when the plug is in the first and third positions; and
    the second detent of the plug is movable over the second protrusion away from the decoupler when the plug is in the second position.

6. The assembly as set forth in claim 1
    wherein the flange is disposed between the decoupler and the second plate, and the flange is movable to pinch the decoupler between the flange and the first plate when the decoupler is in the locked position.

7. The assembly as set forth in claim 1 wherein:
    the actuator is operable in a first mode, a second mode and a third mode;
    the actuator includes a plug disposed in the casing; and
    the plug and the casing are movable relative to the first and second plates, and the plug is movable relative to the casing depending on whether the actuator is operating in the first mode, the second mode or the third mode.

8. The assembly as set forth in claim 7 wherein:
the decoupler is disposed in the unlocked position to allow a degree of free movement of the decoupler between the first and second plates when the actuator is in the first mode, which corresponds to the plug being in a first position to move the casing to an initial position;
the decoupler is disposed in the locked position to sandwich the decoupler to the first plate when the actuator is in the second mode, which corresponds to the plug being in a second position to move the casing to a secondary position;
the decoupler is disposed in the locked position to sandwich the decoupler to the first plate when the actuator is in the third mode, which corresponds to the casing being in the secondary position and the plug being in a third position; and
the initial position and the secondary position of the casing are different from each other.

9. The assembly as set forth in claim 8 wherein the actuator includes a magnetic apparatus that cooperates with the plug, and actuation of the actuator energizes the magnetic apparatus which causes the plug to move to one of the first position, the second position and the third position.

10. The assembly as set forth in claim 9 wherein:
the actuator includes a first biasing member and a second biasing member coupled to the plug which centers the plug relative to the casing when the plug is unlocked from the casing; and
the plug is actively movable relative to the casing via the magnetic apparatus when the plug is unlocked from the casing.

11. The assembly as set forth in claim 10:
wherein the actuator is defined as a voice coil actuator including the plug and the magnetic apparatus;
wherein the plug is actively movable via the magnetic apparatus when the actuator is in the third mode while the decoupler remains in the locked position;
further including a controller in communication with the magnetic apparatus; and
wherein the controller uses information regarding a pressure differential between the first and second chambers and a magnetic force from energizing the magnetic apparatus to control active movement of the plug while the actuator is in the third mode.

12. The assembly as set forth in claim 8 wherein the casing includes a first protrusion, and the first plate includes a first detent, and wherein the first protrusion of the casing is movable across the first detent of the first plate between the initial position and the secondary position.

13. The assembly as set forth in claim 12 wherein the casing includes an outer surface and the first protrusion protrudes outwardly from the outer surface, and wherein the casing defines an opening that is surrounded by an inner surface of the casing, and wherein the plug is disposed in the opening and movable relative to the inner surface between the first, second, and third positions.

14. The assembly as set forth in claim 13 wherein the inner surface of the casing includes a second protrusion, and the plug includes a second detent, and wherein the second detent of the plug is disposed on one side of the second protrusion when the plug is in the first and third positions, and the second detent of the plug is disposed on another side of the second protrusion when the plug is in the second position.

15. A powertrain comprising:
a dynamic mass;
a structure that supports the dynamic mass;
a hydraulic mount assembly attached to the structure and supports the dynamic mass, and wherein the assembly includes:
a mount body defining a cavity;
a first plate fixed relative to the mount body inside the cavity to separate the cavity into a first chamber and a second chamber;
wherein the first plate defines a plurality of first passages that fluidly connects the first and second chambers;
a second plate fixed relative to the mount body inside the cavity to further separate the cavity into the first and second chambers;
the second plate defines a plurality of second passages that fluidly connects the first and second chambers;
a decoupler disposed between the first chamber and the second chamber, and the decoupler overlaps the first plate;
an actuator coupled to the first plate;
wherein:
the decoupler is movable between a locked position and an unlocked position in response to actuation of the actuator; and
the decoupler abuts the first plate when in the locked position to prevent fluid communication through the first passages, and the decoupler is movable relative to the first plate when in the unlocked position to allow fluid communication through the first passages;
the decoupler is disposed between the first and second plates, and the decoupler allows fluid communication between the first and second passages when the decoupler is in the unlocked position;
the actuator is operable in a first mode, a second mode and a third mode;
the actuator includes a casing and a plug disposed in the casing;
the decoupler is disposed in the unlocked position to allow a degree of free movement of the decoupler between the first and second plates when the actuator is in the first mode, which corresponds to the plug being in a first position to move the casing to an initial position;
the decoupler is disposed in the locked position to sandwich the decoupler to the first plate when the actuator is in the second mode, which corresponds to the plug being in a second position to move the casing to a secondary position;
the decoupler is disposed in the locked position to sandwich the decoupler to the first plate when the actuator is in the third mode, which corresponds to the casing being in the secondary position and the plug being in a third position; and
the initial position and the secondary position of the casing are different from each other.

16. The powertrain as set forth in claim 15 wherein the actuator includes a magnetic apparatus that cooperates with the plug, and actuation of the actuator energizes the magnetic apparatus which causes the plug to move to one of the first position, the second position and the third position.

17. The powertrain as set forth in claim 16 wherein:

the casing includes a first protrusion;

the casing includes an outer surface and the first protrusion protrudes outwardly from the outer surface;

the first plate includes a first detent;

the first protrusion of the casing is disposed between the decoupler and the first detent when the casing is in the initial position;

the first protrusion of the casing is movable over the first detent away from the decoupler when the casing is in the secondary position;

the casing defines an opening that is surrounded by an inner surface of the casing;

the plug is disposed in the opening and movable relative to the inner surface between the first, second, and third positions;

the inner surface of the casing includes a second protrusion;

the plug includes a second detent;

the second detent of the plug is disposed between the decoupler and the second protrusion when the plug is in the first and third positions; and the second detent of the plug is movable over the second protrusion away from the decoupler when the plug is in the second position.

18. A hydraulic mount assembly for a powertrain comprising:

a mount body defining a cavity;

a first plate fixed relative to the mount body inside the cavity to separate the cavity into a first chamber and a second chamber;

a second plate fixed relative to the mount body inside the cavity to further separate the cavity into the first and second chambers;

wherein the first plate defines a plurality of first passages that fluidly connects the first and second chambers;

a decoupler disposed between the first chamber and the second chamber, and the decoupler overlaps the first plate;

an actuator coupled to the first plate, and the actuator includes a casing and a flange that extends outwardly from the casing to overlap a portion of the decoupler;

wherein the decoupler is movable between a locked position and an unlocked position in response to actuation of the actuator;

wherein the decoupler abuts the first plate when in the locked position to prevent fluid communication through the first passages, and the decoupler is movable relative to the first plate when in the unlocked position to allow fluid communication through the first passages; and wherein the flange is disposed between the decoupler and the second plate, and the flange is movable to pinch the decoupler between the flange and the first plate when the decoupler is in the locked position.

19. The assembly as set forth in claim 18 wherein:

the second plate defines a plurality of second passages that fluidly connects the first and second chambers; and the decoupler is disposed between the first and second plates, and the decoupler allows fluid communication between the first and second passages when the decoupler is in the unlocked position.

20. The assembly as set forth in claim 19 wherein:

the actuator is operable in a first mode, a second mode and a third mode;

the actuator includes a plug disposed in the casing;

the decoupler is disposed in the unlocked position to allow a degree of free movement of the decoupler between the first and second plates when the actuator is in the first mode, which corresponds to the plug being in a first position to move the casing to an initial position;

the decoupler is disposed in the locked position to sandwich the decoupler to the first plate when the actuator is in the second mode, which corresponds to the plug being in a second position to move the casing to a secondary position;

the decoupler is disposed in the locked position to sandwich the decoupler to the first plate when the actuator is in the third mode, which corresponds to the casing being in the secondary position and the plug being in a third position; and the initial position and the secondary position of the casing are different from each other.

* * * * *